US012617987B2

(12) United States Patent
Shiraishi et al.

(10) Patent No.: US 12,617,987 B2
(45) Date of Patent: May 5, 2026

(54) ADHESIVE FOR ELECTRICAL STORAGE DEVICE PACKAGING MATERIAL, ELECTRICAL STORAGE DEVICE PACKAGING MATERIAL, ELECTRICAL STORAGE DEVICE CONTAINER, AND ELECTRICAL STORAGE DEVICE

(71) Applicants: artience Co., Ltd., Tokyo (JP); TOYO-MORTON, LTD., Tokyo (JP); TOYOCHEM CO., LTD., Tokyo (JP)

(72) Inventors: Koki Shiraishi, Tokyo (JP); Hiroshi Hanaki, Tokyo (JP); Tsutomu Hiroshima, Tokyo (JP); Takafumi Akiyama, Tokyo (JP)

(73) Assignees: artience Co., Ltd., Tokyo (JP); TOYO-MORTON, LTD., Tokyo (JP); TOYOCHEM CO., LTD., Tokyo (JP)

( * ) Notice: Subject to any disclaimer, the term of this patent is extended or adjusted under 35 U.S.C. 154(b) by 344 days.

(21) Appl. No.: 18/191,873

(22) Filed: Mar. 29, 2023

(65) Prior Publication Data

US 2023/0313007 A1 Oct. 5, 2023

(30) Foreign Application Priority Data

Mar. 30, 2022 (JP) ................................. 2022-055830
Nov. 7, 2022 (JP) ................................. 2022-177759

(51) Int. Cl.
*C09J 7/35* (2018.01)
*C09J 175/06* (2006.01)

(52) U.S. Cl.
CPC ............... *C09J 175/06* (2013.01); *C09J 7/35* (2018.01); *C09J 2463/00* (2013.01); *C09J 2467/00* (2013.01); *C09J 2475/00* (2013.01); *Y10T 428/287* (2015.01); *Y10T 428/2896* (2015.01)

(58) Field of Classification Search
None
See application file for complete search history.

(56) References Cited

U.S. PATENT DOCUMENTS

| | | | | |
|---|---|---|---|---|
| 5,478,897 | A † | 12/1995 | Sasano | |
| 2007/0148445 | A1* | 6/2007 | Licht | C08G 18/706 |
| | | | | 428/355 EP |
| 2010/0184923 | A1* | 7/2010 | Yoshida | C08G 59/186 |
| | | | | 525/418 |
| 2011/0104482 | A1* | 5/2011 | Yasui | C09J 175/06 |
| | | | | 428/343 |
| 2011/0151625 | A1† | 6/2011 | Hoshino | |

FOREIGN PATENT DOCUMENTS

| | | |
|---|---|---|
| CN | 102099434 | 6/2011 |
| CN | 104291012 | 1/2015 |
| JP | 2001139913 A † | 5/2001 |
| JP | 2015022910 A † | 2/2015 |
| JP | 2016196580 | 11/2016 |
| JP | 2019156925 | 9/2019 |
| JP | 2021099915 | 7/2021 |
| KR | 20160097204 | 8/2016 |

OTHER PUBLICATIONS

JP2019156925A machine translation, Sep. 19, 2019 (Year: 2019).*
Kr20160097204A, machine translation, Aug. 17, 2016 (Year: 2016).*
"Office Action of Korea Counterpart Application", issued on May 26, 2025, with English translation thereof, p. 1-p. 23.

* cited by examiner
† cited by third party

*Primary Examiner* — Anish P Desai
(74) *Attorney, Agent, or Firm* — JCIPRNET

(57) ABSTRACT

An adhesive for an electrical storage device packaging material containing a polyol compound (A), a polyisocyanate compound (B), and an epoxy resin (C), in which the polyol compound (A) contains an ester bond-containing polyol, and the following formula is satisfied when a stress at the time when a cured film obtained by performing curing under the condition of 80° C. for 2 weeks is stretched to twice its length at a speed of 6 mm/min under an environment of 20° C. and 65% RH is S1 [N/mm²], and a stress at the time when the cured film is held for 100 seconds in a stretched state is S2 [N/mm²]. Formula: $10.0 \leq (S1-S2)/S1 \times 100 \leq 40.0$.

10 Claims, No Drawings

ADHESIVE FOR ELECTRICAL STORAGE DEVICE PACKAGING MATERIAL, ELECTRICAL STORAGE DEVICE PACKAGING MATERIAL, ELECTRICAL STORAGE DEVICE CONTAINER, AND ELECTRICAL STORAGE DEVICE

CROSS-REFERENCE TO RELATED APPLICATION

This application claims priority under 35 U.S.C § 119 to Japanese Patent Application No. 2022-055830, filed on Mar. 30, 2022, and Japanese Patent Application No. 2022-177759, filed on Nov. 7, 2022. Each of the above applicat-ion(s) is hereby expressly incorporated by reference, in its entirety, into the present application.

BACKGROUND

Technical Field

The disclosure relates to an electrical storage device packaging material for forming an electrical storage device container of a lithium-ion battery or the like, and to an adhesive for an electrical storage device packaging material, which has a good appearance and has excellent adhesive strength, moldability, and durability of a molded product in a high temperature atmosphere, an electrical storage device packaging material using the adhesive, an electrical storage device container, and an electrical storage device.

Description of Related Art

The rapid growth of electronic equipment such as mobile phones and portable personal computers has increased the demand for electrical storage devices such as secondary batteries (for example, lithium-ion batteries and nickel-hydrogen batteries), and electrochemical capacitors (for example, electric double layer capacitors). Among these, small lithium-ion batteries are attracting attention because of their high energy density and light weight. Conventionally, metal cans are being used as exterior bodies for lithium-ion batteries, but from the viewpoint of weight reduction and productivity, packaging materials in which plastic films, metal foils, or the like are laminated are becoming main-stream.

For example, Patent Document 1 discloses that an elec-trical storage device packaging material, in which a poly-urethane adhesive containing a polyester urethane polyol having a predetermined urethane bond concentration and a polyisocyanate is used for an outer layer side adhesive layer, has excellent moldability and can suppress appearance defects such as floating between layers without a decrease in adhesive strength between layers even after high-tempera-ture, high-humidity, long-term durability tests.

Patent Document 2 discloses that a laminate adhesive containing a polyester urethane polyol having a predeter-mined number average molecular weight and a polyisocya-nate, and having a sum of the urethane bond content and the isocyanate group content within a predetermined range improves processability, moldability, moisture and heat resistance, and appearance.

Patent Document 3 discloses a laminate adhesive con-taining a polyester urethane polyol having a weight average molecular weight of approximately 40,000, a polyisocya-nate, and an epoxy resin having a specific epoxy equivalent weight, in a predetermined range or amount, and describes that the laminate adhesive can be used as an exterior material or the like for a secondary battery such as a lithium-ion battery.

PATENT DOCUMENTS

[Patent Document 1] Japanese Patent Laid-Open No. 2021-99915

[Patent Document 2] Japanese Patent Laid-Open No. 2016-196580

[Patent Document 3] Japanese Patent Laid-Open No. 2019-156925

SUMMARY

In recent years, with the expansion of applications such as in-vehicle use and household power storage, it has become necessary for secondary batteries to have a large capacity, and for electrical storage device packaging materials to have good moldability. In addition, for automotive applications, good long-term outdoor durability is required in terms of heat resistance and moisture and heat resistance, and from the viewpoint of safety, the development of polymer type lithium-ion batteries and all-solid-state batteries from which low-boiling carbonate solvents contained in the electrolytic solution are removed is progressing, and accordingly, the required heat resistance endurance temperature is also increasing.

However, the packaging materials described in Patent Documents 1 and 2 mainly contain a polyester polyurethane resin in the adhesive layer, and do not contain an epoxy resin. Therefore, there is a problem that the molecular weight decreases due to hydrolysis of the polyester skeleton, and delamination occurs in the molded product when the packaging material is continuously exposed to a severe external environment.

A laminate adhesive described in Patent Document 3 does not satisfy the characteristic formula of the application because the laminate adhesive has a low weight average molecular weight of a polyol component and is extremely soft. Therefore, there is a problem that the adhesive strength is inferior in a high temperature atmosphere of approxi-mately 120° C., for example.

Accordingly, the disclosure provides an adhesive for an electrical storage device which is excellent in adhesive strength in a high temperature atmosphere (hereinafter referred to as hot strength), particularly in hot strength between a film and a metal foil. In addition, the disclosure provides an electrical storage device packaging material, an electrical storage device container, and an electrical storage device that have good adhesive strength in a high tempera-ture atmosphere and are excellent in reliability.

As a result of earnest studies to solve the above problems, it was found that the above problems could be solved by the following embodiments, and the disclosure was completed.

According to an embodiment of the disclosure, there is provided an adhesive for an electrical storage device pack-aging material containing a polyol compound (A), a polyi-socyanate compound (B), and an epoxy resin (C), in which the polyol compound (A) contains an ester bond-containing polyol, and the following formula is satisfied when a stress at the time when a cured film obtained by curing the adhesive for an electrical storage device packaging material under the condition of 80° C. for 2 weeks is stretched to twice its length at a speed of 6 mm/min under an environ-ment of 20° C. and 65% RH is S1 [N/mm$^2$], and a stress at the time when the cured film is held for 100 seconds in a stretched state is S2 [N/mm$^2$].

$$10.0 \leq (S1-S2)/S1 \times 100 \leq 40.0 \qquad \text{Formula:}$$

In the adhesive for an electrical storage device packaging material according to the embodiment of the disclosure, the ester bond-containing polyol has a weight average molecular weight of 50,000 to 100,000.

In the adhesive for an electrical storage device packaging material according to the embodiment of the disclosure, the ester bond-containing polyol has an ester bond concentration of 8.5 to 10.5 [mmol/g].

In the adhesive for an electrical storage device packaging material according to the embodiment of the disclosure, the epoxy resin (C) has an epoxy equivalent weight of 90 to 1,200 [g/eq].

In the adhesive for an electrical storage device packaging material according to the embodiment of the disclosure, the polyol compound (A) contains a polyester polyol, and the epoxy resin (C) contains an epoxy resin having an epoxy equivalent weight of 150 to 1,000 [g/eq].

In the adhesive for an electrical storage device packaging material according to the embodiment of the disclosure, the polyol compound (A) contains a polyester urethane polyol, and the epoxy resin (C) contains an epoxy resin having an epoxy equivalent weight of 100 to 450 [g/eq].

In the adhesive for an electrical storage device packaging material according to the embodiment of the disclosure, a storage elastic modulus of the cured film at 120° C. is $1.00 \times 10^5$ to $9.99 \times 10^7$ [Pa].

According to another embodiment of the disclosure, there is provided an electrical storage device packaging material having a configuration in which at least an outer layer side resin film layer, an outer layer side adhesive layer, a metal foil layer, an inner layer side adhesive layer, and a heat seal layer are sequentially laminated, in which the outer layer side adhesive layer is a cured product of the adhesive for an electrical storage device packaging material.

According to still another embodiment of the disclosure, there is provided an electrical storage device container formed from the electrical storage device packaging material, in which an outer layer side resin film layer forms a convex surface and a heat seal layer forms a concave surface.

According to still another embodiment of the disclosure, there is provided an electrical storage device including: the electrical storage device container.

According to the disclosure, it is possible to provide the adhesive for an electrical storage device which is excellent in adhesive strength in a high temperature atmosphere (hereinafter referred to as hot strength) of a film and a metal foil. In addition, it is possible to provide a packaging material, an electrical storage device container, and an electrical storage device that have good adhesive strength in a high temperature atmosphere and are excellent in reliability such as high temperature durability, wet heat durability, and heat seal resistance.

DESCRIPTION OF THE EMBODIMENTS

<Adhesive for Electrical Storage Device Packaging Material>

In an adhesive for an electrical storage device packaging material of the disclosure containing a polyol compound (A), a polyisocyanate compound (B), and an epoxy resin (C), the polyol compound (A) contains an ester bond-containing polyol, and it is important to satisfy the following formula when a stress at the time when a cured film obtained by curing the adhesive for an electrical storage device packaging material under the condition of 80° C. for 2 weeks is stretched to twice its length at a speed of 6 mm/min under an environment of 20° C. and 65% RH is S1 [N/mm$^2$], and a stress at the time when the cured film is held for 100 seconds in a stretched state is S2 [N/mm$^2$].

$$10.0 \leq (S1-S2)/S1 \times 100 \leq 40.0 \qquad \text{Formula:}$$

The above formula represents the degree of stress relaxation of the cured film.

In general, the epoxy resin (C) has a rigid molecular structure, and therefore, by adding the epoxy resin (C) to an adhesive for an electrical storage device, the heat resistance durability of the adhesive can be improved. In particular, by adding the epoxy resin (C) to a polyester-based adhesive, it is possible to suppress the hydrolysis of the polyester and significantly improve the moisture and heat resistance. On the other hand, the epoxy resin reduces the stress relaxation properties of the adhesive due to the rigidity of the skeleton thereof.

However, as described above, the adhesive of the disclosure, which contains an ester bond-containing polyol, a polyisocyanate, and an epoxy resin, and of which the cured film satisfies the above formula, can form a coating film with excellent stress relaxation, and exhibits excellent adhesive strength (hot strength) and moldability in a high temperature atmosphere even though the epoxy resin is contained. As a result, a molded product using the adhesive is excellent in wet heat durability, high temperature durability, and heat seal resistance.

Specifically, when the value of the above formula is 10.0 or more, excellent stress relaxation properties, good substrate wetting, and excellent hot strength, moisture and heat resistance, heat resistance durability, and moldability are obtained. When the value of the above formula is 40.0 or less, the stress relaxation properties are not excessive, the cohesive force is maintained, and the hot strength and moldability are excellent. The value of the above formula is preferably 10.0 or more and 30.0 or less.

In addition, in the adhesive according to the disclosure, it is preferable that a storage elastic modulus at 120° C. of a cured film obtained by curing the adhesive at 80° C. for 2 weeks be $1.00 \times 10^5$ to $9.99 \times 10^7$ (Pa). When the storage elastic modulus is within the above range, the cured film obtained from the adhesive maintains a balance between the cohesive force and the adhesion to the substrate even at a high temperature, and exhibits good adhesive strength under high temperature conditions, which is preferable. More preferably, the storage elastic modulus is in the range of $1.00 \times 10^6$ to $9.99 \times 10^7$ (Pa).

The storage elastic modulus can be measured, for example, by a method conforming to JIS K 7244-1.

Adhesives used as battery packaging materials are required to have good moldability, and it is necessary for the adhesive cured film to follow the elongation of the substrate during molding. In addition, from the viewpoint of moldability, stretchability to at least approximately double is required, and when stretching approximately double is not possible, defects such as cracks in the molded product are caused. Therefore, an adhesive of which the cured film cannot be stretched to twice its length has extremely poor moldability and is therefore considered not to satisfy the above formula.

The disclosure will be described in detail below.

<Polyol Compound (A)>

The polyol compound (A) contains an ester bond-containing polyol. The ester bond-containing polyol may be a compound containing two or more ester bonds and two or more hydroxyl groups in the molecule. By containing polyester polyol, the compound has excellent cohesive force and exhibits excellent adhesive strength.

[Ester Bond-Containing Polyol]

Examples of ester bond-containing polyols include reactants of polybasic acids and polyhydric alcohols; ring-opening polymerized lactones such as polycaprolactone, polyvalerolactone, and poly(β-methyl-γ-valerolactone); and modified products of these. Ester bond-containing polyols may be used alone or in a combination of two or more.

Examples of the polybasic acid include, but are not limited to, aromatic polybasic acids such as terephthalic acid, isophthalic acid, naphthalenedicarboxylic acid, and phthalic anhydride; aliphatic polybasic acids such as adipic acid, azelaic acid, sebacic acid, succinic acid, glutaric acid, tetrahydrophthalic anhydride, hexahydrophthalic anhydride, maleic anhydride, and itaconic anhydride; dialkyl esters thereof; and mixtures thereof.

Examples of polyhydric alcohols include, but are not limited to, ethylene glycol, propylene glycol, diethylene glycol, dipropylene glycol, triethylene glycol, butylene glycol, neopentyl glycol, dineopentyl glycol, butylethylpropanediol, 2-methyl-1,3-propanediol, trimethylolpropane, glycerin, 1,6-hexanediol, 1,4-butanediol, 1,4-cyclohexanedimethanol, 3-methyl-1,5-pentanediol, 3,3'-dimethylolheptane, 1,9-nonanediol, polyoxyethylene glycol, polyoxypropylene glycol, polytetramethylene ether glycol, polyether polyol, polycarbonate polyol, polyolefin polyol, acrylic polyol, polyurethane polyol, or mixtures thereof.

Each of the polybasic acid component and the polyhydric alcohol component may be used alone or in a combination of two or more.

The weight average molecular weight of the ester bond-containing polyol is preferably 50,000 to 100,000, more preferably 55,000 to 85,000. When the weight average molecular weight is 50,000 or more, the stretchability of the resin increases and the processability improves. When the weight average molecular weight is 100,000 or less, the viscosity of the adhesive is not excessively high, and deterioration of moldability due to appearance defects can be suppressed.

Further, by controlling the weight average molecular weight to 55,000 to 85,000, both the stretchability of the resin and the viscosity of the adhesive solution are easily achieved, and this can be used more suitably.

The ester bond concentration of the ester bond-containing polyol is preferably 8.5 mmol/g to 10.5 mmol/g, more preferably 9.0 to 10.0 mmol/g. When the ester bond concentration of the ester bond-containing polyol is 8.5 mmol/g or more, the solubility in an ester solvent such as ethyl acetate is excellent, which is preferable. A case where the ester bond concentration is 10.5 mmol/g or less is preferable because an increase in viscosity and a decrease in solvent solubility due to intermolecular interaction due to an ester bond are suppressed.

The ester bond concentration of the ester bond-containing polyol can be calculated using the following formula.

$$\text{ester bond concentration (mmol/g)} = \frac{\text{charged molar amount of polybasic acid component} \times \text{sum of number of carboxylic acid functional groups}}{(\text{total charged amount} \times \text{solid yield})} \times 1000 \qquad \text{Formula:}$$

For example, taking the polyester (a)-3 in the examples that will be described later as an example, since orthophthalic acid (number of functional groups: 2): 231.3 g=1.393 mol, terephthalic acid (number of functional groups: 2): 231.3 g=1.393 mol, adipic acid (number of functional groups: 2): 174.4 g=1.195 mol, the total charged amount is 1000.0 g, and the yield is 84.7%, the ester bond concentration of the polyester (a)-3 can be calculated as $(1.393 \times 2 + 1.393 \times 2 + 1.195 \times 2)/(1000.0 \times 0.847) \times 1000 = 9.40$ (mmol/g).

In addition, when the ester bond-containing polyol is a polyester urethane polyol that will be described later, the ester bond concentration can be calculated using the following formula.

$$\text{ester bond concentration (mmol/g)} = \text{polyester bond concentration of polyester polyol (mmol/g)} \times \text{ratio of polyester polyol to the total mass of polyol and polyisocyanate that make up urethane resins.} \qquad \text{Formula:}$$

For example, the ester bond concentration of the polyester urethane polyol shown in urethane (b)-1 in the examples that will be described later is polyester bond concentration=9.40 (mmol/g)×(100/(100+2.5))=9.17 (mmol/g).

The glass transition point of the ester bond-containing polyol is preferably −20° C. to 40° C., more preferably −10 to 20° C. When the glass transition point is −20° C. or higher, the cohesive force of the resin is further increased, and the adhesiveness is further improved. When the glass transition point is 40° C. or less, the affinity to the substrate during lamination is further enhanced, and the adhesive strength after aging is further improved.

In the specification, the glass transition point can be determined, for example, by a method conforming to JIS K 6240.

An ester bond-containing polyol is preferably a reaction product of a polybasic acid and a polyhydric alcohol (hereinafter referred to as polyester polyol), or a modified product thereof. The polybasic acid preferably contains 50 to 80% by mol of the aromatic polybasic acid component in 100% by mol of the polybasic acid component. When the aromatic polybasic acid component is 50% by mol or more, the cohesive force derived from the aromatic ring is increased and the moldability is improved. A case where the aromatic polybasic acid component is 80% by mol or less is preferable because deterioration in adhesiveness is suppressed.

(Polyester Polyol)

Polyester polyols in the specification are reaction products of polybasic acids and polyhydric alcohols, as described above.

The hydroxyl value of the polyester polyol is preferably 0.5 to 20 mgKOH/g, more preferably 3 to 10 mgKOH/g. The hydroxyl groups are used for the cross-linking reaction with the polyisocyanate component (b), which will be described later, and as the cross-linking reaction progresses, the adhesive increases in molecular weight and heat resistance as a packaging material can be enhanced. The hydroxyl value can be determined, for example, by a method conforming to JIS K 1557-1.

[Modified Product: Polyester Urethane Polyol]

Examples of the modified polyester polyol include polyol (hereinafter referred to as polyester urethane polyol) in which the hydroxyl groups in the polyester polyol, which is the reaction product of the above-described polybasic acid and polyhydric alcohol, react with polyisocyanate under the condition of excessive hydroxyl groups to introduce urethane bonds.

<<Polyisocyanate>>

Examples of the polyisocyanate include aliphatic diisocyanates, alicyclic diisocyanates, aromatic diisocyanates, araliphatic diisocyanates, tri- or higher functional polyisocyanate monomers, and various derivatives derived from the diisocyanates.

Examples of aliphatic diisocyanates include trimethylene diisocyanate, tetramethylene diisocyanate, hexamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatomethylcaproate.

Examples of alicyclic diisocyanates include 1,4-cyclohexane diisocyanate, 1,3-cyclohexane diisocyanate, 3-isocyanatomethyl-3,5,5-trimethylcyclohexyl isocyanate, 4,4'-methylenebis(cyclohexyl isocyanate), methyl-2,4-cyclohexane diisocyanate, methyl-2,6-cyclohexane diisocyanate, 1,4-bis(isocyanatomethyl)cyclohexane, and 1,3-bis(isocyanatomethyl)cyclohexane.

Examples of aromatic diisocyanates include m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate or mixtures thereof, 4,4'-toluidine diisocyanate, dianisidine diisocyanate, and 4,4'-diphenyl ether diisocyanate.

Examples of araliphatic diisocyanates include 1,3- or 1,4-xylylene diisocyanate or mixtures thereof, and ω,ω'-diisocyanate-1,4-diethylbenzene, 1,3- or 1,4-bis(1-isocyanato-1-methylethyl)benzene or mixtures thereof.

Examples of tri- or higher functional polyisocyanate monomers include triisocyanate such as triphenylmethane-4,4',4''-triisocyanate, 1,3,5-triisocyanatobenzene, and 2,4,6-triisocyanatotoluene; and tetraisocyanate such as 4,4'-diphenyldimethylmethane-2,2'-5,5'-tetraisocyanate.

As various derivatives derived from the diisocyanate, low-molecular-weight polyols with a molecular weight of less than 200 such as the diisocyanate, ethylene glycol, propylene glycol, butylene glycol, hexylene glycol, neopentyl glycol, 1,6-hexanediol, 3-methyl-1,5-pentanediol, 3,3'-dimethylolpropane, cyclohexanedimethanol, diethylene glycol, triethylene glycol, dipropylene glycol, glycerol, trimethylolpropane, pentaerythritol, and sorbitol, or adducts with castor oil or the like; a trimer of the diisocyanate (also referred to as nurate); biuret; allophanate; and polyisocyanate having a 2,4,6-oxadiazinetrione ring obtained from carbon dioxide gas and the diisocyanate can be used.

Among the polyisocyanates that make up the polyester urethane polyisocyanate, tolylene diisocyanate, 4,4'-diphenyl diisocyanate, or 3-isocyanatomethyl-3,5,5-trimethylcyclohexyl isocyanate is preferable from the viewpoint of moldability of packaging materials and heat seal resistance of deformed molded products.

The polyol that reacts with the polyisocyanate may contain conventionally known other polyols in addition to the polyester polyol. Other polyols that may be used in a combination include, for example, polyether polyols, polycarbonate polyols, acrylic polyols, polybutadiene polyols, and polyhydric alcohols in the above section of [Ester bond-containing polyol].

From the viewpoint of reactivity with polyisocyanate, other preferred polyols are linear diols such as 1,4-butanediol.

The reaction temperature between the polyol containing the polyester polyol and the polyisocyanate in obtaining the polyester urethane polyol is preferably in the range of 50° C. to 200° C., more preferably 80° C. to 150° C. In the urethanization reaction, the molar ratio of the isocyanate groups of the polyisocyanate to the hydroxyl groups in the polyol containing the polyester polyol (number of moles of isocyanate groups/number of moles of hydroxyl groups) is preferably 0.1 to 0.9, more preferably 0.3 to 0.8.

When the ester bond-containing polyol is a polyester urethane polyol, the weight average molecular weight of the polyester polyol used for urethanization is preferably in the range of 10,000 to 30,000. When the weight average molecular weight is 10,000 or more, the adhesiveness to the substrate is further improved and the processability is excellent. When the weight average molecular weight is 30,000 or less, the hydroxyl group concentration at the terminal of the polyester polyol is not excessively low, and the reaction with the polyisocyanate proceeds rapidly.

The hydroxyl value of the polyester urethane polyol is preferably 0.5 to 20 mgKOH/g, more preferably 1 to 10 mgKOH/g. The hydroxyl groups in the polyester urethane polyol are used for the cross-linking reaction with the polyisocyanate compound (B), which will be described later, and as the cross-linking reaction progresses, the adhesive increases in molecular weight and heat resistance as a packaging material can be enhanced. The hydroxyl value can be determined, for example, by a method conforming to JIS K 1557-1.

The urethane bond concentration of the polyester urethane polyol is preferably in the range of 0.10 to 0.90 mmol/g, more preferably 0.10 to 0.50 mmol/g. When the urethane bond concentration is 0.10 mmol/g or more, excellent stretchability is exhibited, and moldability is further improved. When the urethane bond concentration is 0.90 mmol/g or less, the urethane bond concentration is not excessively high and the viscosity is appropriate, and thus the coatability and appearance are more excellent.

The urethane bond concentration can be calculated using the following formula.

$$
\begin{aligned}
\text{urethane bond concentration (mmol/g)} = & (\% \text{ by mass} \\
& \text{of NCO in polyisocyanate}) \times (\% \text{ by mass of} \\
& \text{polyisocyanate})/42 \times 1000 + (\text{number of urethane} \\
& \text{bonds inside polyisocyanate/polyisocyanate} \\
& \text{molecular weight}) \times (\% \text{ by mass of polyisocya-} \\
& \text{nate}) \times 1000
\end{aligned}
\qquad \text{Formula:}
$$

For example, regarding the urethane bond concentration of urethane (b)-1 in the examples that will be described later, because % by mass of NCO in tolylene diisocyanate is 48.2%, the amount added is 2.5% by mass, and the number of internal urethane bonds is zero, urethane bond concentration=0.482×(2.5/(100+2.5))/42×1000=0.28 mmol/g.

[Modified Product: Modified Acid Anhydride]

Further, as a modified polyester polyol, for example, some of the hydroxyl groups in the polyester polyol, which is the reaction product of the above-described polybasic acid and polyhydric alcohol, may react with an acid anhydride to introduce carboxy groups.

<<Acid Anhydride>>

Examples of the acid anhydride include pyromellitic anhydride, mellitic anhydride, trimellitic anhydride, and trimellitic ester anhydride. Examples of the trimellitic ester anhydrides nclude ester compounds obtained by subjecting an alkylene glycol or alkanetriol having 2 to 30 carbon atoms to an esterification reaction with trimellitic anhydride. Specifically, ethylene glycol bisanhydro trimellitate, propylene glycol bisanhydro trimellitate, and the like can be used.

From the viewpoint of heat resistance durability, the ester bond-containing polyol preferably contains a polyester polyol which is a reaction product of a polybasic acid and a polyhydric alcohol. Moreover, from the viewpoint of hot strength and wet heat durability, it is preferable to contain a polyester urethane polyol which is a reaction product of a polybasic acid and a polyhydric alcohol and a reaction product of a polyisocyanate.

[Other Polyols]

The polyol compound (A) may contain a polyol other than the ester bond-containing polyol within a range that does not impair the effects of the disclosure. Such polyols are not limited as long as polyols do not contain ester bonds, and for example, in addition to polyether polyols, polycarbonate polyols, acrylic polyols, and polybutadiene polyols, polyhydric alcohols in the above section of [Ester bond-containing polyol].

<Polyisocyanate Compound (B)>

The polyisocyanate compound (B) performs a cross-linking reaction with the hydroxyl groups in the polyol compound (A), increases the molecular weight of the adhesive layer, and plays a role of improving the internal cohesive force that develops energy elasticity. In addition, since the isocyanate group in the polyisocyanate compound (B) can react with water to form a urea bond with high cohesive force, the cohesive force of the adhesive layer can be increased by causing a self cross-linking reaction during curing.

In addition, the polyisocyanate compound (B) has the function of improving the interaction with the substrate surface, which will be described later. In particular, when using a substrate that has undergone physical treatment such as corona discharge treatment or chemical treatment such as organic primer, a chemical reaction between the isocyanate groups in the polyisocyanate compound (B) and the active hydrogen groups on the surface of the substrate can develop a strong interaction with the substrate.

Thus, by using the polyisocyanate compound (B), it is possible to form a strong adhesive layer, the adhesive layer suppresses the expansion and contraction of the substrate due to sudden environmental changes, and the adhesive strength can be maintained at a high level.

As the polyisocyanate compound (B), those described in the section (Polyisocyanate) in the above [Modified product: polyester urethane polyol] can be used. The polyisocyanate compound (B) may be used alone or in a combination of two or more.

Among them, the polyisocyanate compound (B) is preferably a diisocyanate nurate, an adduct obtained by adding trimethylolpropane to a diisocyanate, a biuret type, a prepolymer having an isocyanate residue (a low polymer obtained from a diisocyanate and a polyol), a uretdione having an isocyanate residue, an allophanate, or a complex thereof.

From the viewpoint of achieving both excellent high temperature durability and high cohesive force and processability in vehicle-mounted electrical storage device applications, the polyisocyanate compound (B) is preferably an adduct of tolylene diisocyanate and trimethylolpropane, 3-isocyanatomethyl-3,5,5-trimethylcyclohexyl isocyanate, or a nurate of hexamethylene diisocyanate. From the viewpoint of adhesiveness, 3-isocyanatomethyl-3,5,5-trimethylcyclohexyl isocyanate or hexamethylene diisocyanate nurate is more preferable.

The content of the polyisocyanate compound (B) is preferably 5.0% by mass or more, more preferably 10.0% by mass or more, and still more preferably 12.0% by mass, based on the solid content mass of the polyol compound (A). The content of the polyisocyanate compound (B) is also preferably 60.0% by mass or less, more preferably 50.0% by mass or less, and even more preferably 45.0% by mass or less.

When the polyisocyanate compound (B) is 5.0% by mass or more, the molecular weight of the adhesive layer, which is the cured product of the adhesive, can be efficiently increased. As a result, the rise of the internal cohesive force is improved, and high adhesiveness and moldability are obtained. When the content of the polyisocyanate compound (B) is 60.0% by mass or less, the amount of highly polar urethane bonds and urea bonds generated by the cross-linking reaction can be properly controlled, and both adhesiveness and durability of the molded product can be achieved.

<Epoxy Resin (C)>

The adhesive for an electrical storage device packaging material of the disclosure further contains an epoxy resin (C). By containing the epoxy resin (C), excellent adhesive strength to metal-based materials such as metal foil is exhibited. Moreover, moisture and heat resistance improves further by containing the epoxy resin (C).

In general, when an adhesive has an ester bond, acid is generated by hydrolysis in a hot and humid environment, and the generated acid acts as a hydrolysis catalyst, accelerating the decrease in molecular weight. As a result of the reduced molecular weight, the cohesive force is reduced, causing delamination. However, by containing the epoxy resin, the epoxy resin reacts with the acid generated to cross-link with the polyester, and the decrease in molecular weight can be suppressed. As a result, it is presumed that the moisture and heat resistance is improved.

Examples of the epoxy resin (C) include bisphenol A type epoxy resin, bisphenol F type epoxy resin, phenoxy resin, bisphenol A novolac type epoxy resin, phenol novolac type epoxy resin, cresol novolac type epoxy resin, trishydroxyphenylmethane type epoxy resin, tetrakisphenolethane type epoxy resin, diphenyldiaminomethane type epoxy resin, aminophenol type epoxy resin, biphenyl type epoxy resin, polycyclic aromatic type epoxy resin, tetramethylbiphenol type epoxy resin, flexible epoxy resin, hydrogenated bisphenol A type epoxy resin, aliphatic skeleton epoxy resin, and alicyclic skeleton epoxy resin.

From the viewpoint of adhesiveness and durability of molded products, the epoxy resin (C) is preferably at least one selected from the group consisting of polyfunctional epoxy resins such as bisphenol A type epoxy resin; novolac type epoxy resin such as bisphenol A novolac type epoxy resin, phenol novolac type epoxy resin, and cresol novolac type epoxy resin; trishydroxyphenylmethane type epoxy resin; and tetrakisphenolethane type epoxy resin.

One type of these epoxy resins (C) may be used alone, or two or more types may be used in a combination.

The epoxy resin (C) preferably has an epoxy equivalent weight of 90 to 1,200 [g/eq] from the viewpoint of adhesiveness and durability of molded products.

The incorporated amount of the epoxy resin (C) is preferably 1 to 80% by mass based on the solid content mass of the polyol compound (A) from the viewpoint of adhesiveness and durability of the molded product. When the incorporated amount of the epoxy resin (C) is 1% by mass or more, the durability of the molded product is effectively improved, and when the incorporated amount of the epoxy resin (C) is 80% by mass or less, the deterioration of the heat seal resistance of the deformed molded product is suppressed.

The adhesive for an electrical storage device packaging material of the disclosure has appropriate stress relaxation properties while using an epoxy resin. The composition of the polyol compound (A), the polyisocyanate compound (B), and the epoxy resin (C) described above is not particularly limited as long as the obtained cured film has a predetermined stress relaxation rate. However, for example, when heat resistance is important, it is preferable to combine the epoxy resin (C) having high rigidity, that is, a high epoxy equivalent weight, and the flexible polyol compound (A).

Specifically, the epoxy resin (C) preferably contains an epoxy resin having an epoxy equivalent weight of 150 to 1,000 [g/eq]. As such an epoxy resin, a room-temperature-solid Bis-A type epoxy resin can be suitably used.

Moreover, the flexible polyol compound (A) preferably contains a polyester polyol which is a reaction product of a polybasic acid and a polyhydric alcohol. Since the polyester polyol does not have urethane bonds, flexibility is excellent.

The incorporated amount of the epoxy resin (C) containing the epoxy resin having an epoxy equivalent weight of 150 to 1,000 [g/eq] is preferably 20 to 85% by mass, more preferably 30 to 80% by mass based on the solid content mass of the polyol compound (A) containing flexible polyester polyol from the viewpoint of both adhesion to the substrate and heat resistance. When the incorporated amount is 20% by mass or more, the heat resistance is improved, and when the incorporated amount is 85% by mass or less, the adhesiveness to the substrate is excellent.

On the other hand, when using the epoxy resin (C) having a low epoxy equivalent weight, it is preferable to combine with the slightly rigid polyol compound (A).

Specifically, the epoxy resin (C) preferably contains an epoxy resin having an epoxy equivalent weight of 100 to 450 [g/eq], preferably 150 to 350 [g/eq]. As such an epoxy resin, at least one selected from the group consisting of room temperature liquid Bis-A type epoxy resin, Bis-A type novolac epoxy resin, and cresol novolac type epoxy resin can be suitably used.

Moreover, the slightly rigid polyol compound (A) preferably contains a polyester urethane polyol which is a reaction product of a polyester polyol and a polyisocyanate. Since the polyester urethane polyol has urethane bonds, the polyester urethane polyol is more rigid than polyester polyol.

The incorporated amount of the epoxy resin (C) containing the epoxy resin having an epoxy equivalent weight of 100 to 450 [g/eq] is preferably 5 to 40% by mass, more preferably 10 to 35% by mass based on the solid content mass of the polyol compound (A) containing slightly rigid polyester urethane polyol from the viewpoint of both adhesion to the substrate and moisture and heat resistance. When the incorporated amount is 5% by mass or more, the moisture and heat resistance is improved, and when the incorporated amount is 40% by mass or less, the adhesiveness to the substrate is excellent.

<Solvent>

In the adhesive for an electrical storage device packaging material of the disclosure, in order to adjust the viscosity of the coating liquid to an appropriate level when the substrate is coated with the adhesive, a solvent may be contained a range that does not affect the substrate in the drying step. Examples of solvents include ketone compounds such as acetone, methyl ethyl ketone, methyl isobutyl ketone, and cyclohexanone; ester compounds such as methyl acetate, ethyl acetate, butyl acetate, ethyl lactate, and methoxyethyl acetate; ether compounds such as diethyl ether and ethylene glycol dimethyl ether; aromatic compounds such as toluene and xylene; aliphatic compounds such as pentane and hexane; halogenated hydrocarbon compounds such as methylene chloride, chlorobenzene, and chloroform; and alcohols such as ethanol, isopropyl alcohol, and normal butanol. These solvents may be used alone, or two or more thereof may be used in a combination.

<Optional Component>

The adhesive for an electrical storage device packaging material of the disclosure may further contain other components as shown below within a range that does not impair the effects of the disclosure. Other components may be incorporated with any of the polyol compound (A), the polyisocyanate compound (B), and the epoxy resin (C), or may be incorporated when these are mixed. One of these optional components may be used alone, or two or more of these may be used in a combination, and are appropriately selected according to the required performance.

(Reaction Accelerator)

The adhesive for an electrical storage device packaging material can further contain a reaction accelerator in order to promote the urethanization reaction. Examples of reaction accelerators include metallic catalysts such as dibutyltin diacetate, dibutyltin dilaurate, dioctyltin dilaurate, and dibutyltin dimaleate; tertiary amines such as 1,8-diaza-bicyclo(5,4,0)undecene-7,1,5-diazabicyclo(4,3,0)nonene-5, and 6-dibutylamino-1,8-diazabicyclo(5,4,0)undecene-7; and reactive tertiary amines such as triethanolamine.

(Phosphoric Acid or Derivative Thereof)

The adhesive for an electrical storage device packaging material can contain phosphoric acid or a phosphoric acid derivative in order to improve the adhesive strength to metal-based materials such as metal foil. Phosphoric acid may have at least one free oxyacid, and examples thereof include phosphoric acids such as hypophosphorous acid, phosphorous acid, orthophosphoric acid, and hypophosphoric acid; and condensed phosphoric acids such as metaphosphoric acid, pyrophosphoric acid, tripolyphosphoric acid, polyphosphoric acid, and ultraphosphoric acid. In addition, examples of phosphoric acid derivatives include those obtained by partially esterifying the above phosphoric acid with alcohols while leaving at least one free oxyacid. Examples of the alcohols include aliphatic alcohols such as methanol, ethanol, ethylene glycol, and glycerin; and aromatic alcohols such as phenol, xylenol, hydroquinone, catechol, and phloroglucinol.

(Leveling Agent or Antifoaming Agent)

The adhesive for an electrical storage device packaging material can contain a leveling agent or an antifoaming agent to improve the laminated appearance of the packaging material. Examples of leveling agents include polyether-modified polydimethylsiloxane, polyester-modified polydimethylsiloxane, aralkyl-modified polymethylalkylsiloxane, polyester-modified hydroxyl-containing polydimethylsiloxane, polyether ester-modified hydroxyl group-containing polydimethylsiloxane, acrylic copolymer, methacrylic copolymer, polyether-modified polymethylalkylsiloxane, alkyl acrylate copolymer, alkyl methacrylate copolymer, and lecithin.

Examples of antifoaming agents include known agents such as silicone resin, silicone solution, and copolymer of alkyl vinyl ether, alkyl acrylate, and alkyl methacrylate.

(Additive)

The adhesive for an electrical storage device packaging material may contain known additives as long as the effects of the disclosure are not impaired. Examples of additives include inorganic fillers such as silica, alumina, mica, talc, aluminum flakes, and glass flakes, layered inorganic compounds, stabilizers (ultraviolet absorbers, anti-hydrolysis agents, and the like), rust inhibitors, thickening agents, plasticizing agents, antistatic agents, lubricants, antiblocking agents, coloring agents, fillers, nucleating agents, and catalysts for adjusting the curing reaction.

<Electrical Storage Device Packaging Material>

The adhesive for an electrical storage device packaging material of the disclosure can be used as an adhesive for forming an adhesive layer of an electrical storage device packaging material. Among these, the adhesive for an electrical storage device packaging material can be suitably used as an outer layer side adhesive for forming an outer layer side adhesive layer of the electrical storage device packaging material.

The electrical storage device packaging material of the disclosure has a configuration in which at least an outer layer side resin film layer, an outer layer side adhesive layer, a metal foil layer, and a heat seal layer are laminated in this order from the outside, and the outer layer side adhesive layer is a cured product of the above-described adhesive for an electrical storage device packaging material.

The method for manufacturing the electrical storage device packaging material is not particularly limited, and the packaging material can be manufactured by a known method.

For example, after laminating the outer layer side resin film layer and the metal foil layer using the above-described adhesive for an electrical storage device packaging material that forms the outer layer side adhesive layer to obtain an intermediate laminated body having a configuration of the outer layer side resin film layer/outer layer side adhesive layer/metal foil layer, the electrical storage device packaging material can be manufactured by laminating the heat seal layer on the metal foil layer surface of the intermediate laminated body using an inner layer side adhesive (hereinafter referred to as manufacturing method 1).

Alternatively, after laminating the metal foil layer and the heat seal layer using the inner layer side adhesive to obtain the intermediate laminated body having a configuration of the metal foil layer/inner layer side adhesive layer/heat seal layer, the electrical storage device packaging material can be manufactured by laminating the metal foil layer of the intermediate laminated body and the outer layer side resin film layer using the adhesive for an electrical storage device packaging material (hereinafter referred to as manufacturing method 2).

In the case of the manufacturing method 1, after applying the adhesive for an electrical storage device packaging material to one side of the substrate of either the outer layer side resin film layer or the metal foil layer, and volatilizing the solvent, it is preferable to superimpose the other substrate on the uncured outer layer side adhesive layer under heat and pressure, and then to cure the outer layer side adhesive layer by aging at room temperature to less than 100° C. When the aging temperature is less than 100° C., heat shrinkage of the outer layer side resin film layer does not occur, and thus the breaking elongation and breaking stress that affect molding do not decrease, and the molding productivity does not decrease due to film curling.

The coating amount of the outer layer side adhesive after drying is preferably approximately 1 to 15 g/m$^2$.

In the case of the manufacturing method 2, the adhesive for an electrical storage device packaging material may be applied to either the outer layer side resin film layer or the metal foil layer surface of the intermediate laminated body.

Examples of the method for forming the outer layer side adhesive layer include a method using a comma coater, dry laminator, roll knife coater, die coater, roll coater, bar coater, gravure roll coater, reverse roll coater, blade coater, gravure coater, micro gravure coater, or the like.

[Outer Layer Side Resin Film Layer]

Although the outer layer side resin film layer is not particularly limited, it is preferable to use a stretch film made of polyamide or polyester. The outer layer side resin film layer may be colored with a pigment such as carbon black or titanium oxide.

In addition, the non-laminated surface of the outer layer side resin film layer may be coated with a coating agent or a slip agent for the purpose of scratch prevention and electrolytic solution resistance, or may be coated with a printing ink for the purpose of designability. Moreover, two or more layers of films may be laminated in advance on the outer layer side resin film layer. Although the thickness of the outer layer side resin film layer is not particularly limited, the thickness is preferably 12 to 100 μm.

The storage elastic modulus at 120° C. of the outer layer side adhesive layer is preferably 1.00×10$^5$ to 9.99×10$^7$ (Pa). The range of 1.00×10$^5$ to 9.99×10$^7$ (Pa) is preferable because the adhesive coating film maintains a balance between the cohesive force and the adhesion to the substrate even at a high temperature, and exhibits good adhesive strength under high temperature conditions. More preferably, the storage elastic modulus is in the range of 1.00×10$^6$ to 9.99×10$^7$ (Pa).

[Metal Foil Layer]

Although the metal foil layer is not particularly limited, an aluminum foil layer is preferable. Although the thickness of the metal foil layer is not particularly limited, the thickness of 20 to 80 μm is preferable. In addition, it is preferable that the surface of the metal foil layer be subjected to known antiseptic treatment such as chromate phosphate treatment, chromate treatment, trivalent chromium treatment, zinc phosphate treatment, zirconium phosphate treatment, acid zirconium treatment, titanium phosphate treatment, hydrofluoric acid treatment, cerium treatment, and hydrotalcite treatment. Due to the antiseptic treatment, corrosion deterioration of the metal foil surface due to the battery electrolytic solution can be suppressed. Furthermore, it is preferable that a known organic primer such as phenolic resin, amide resin, acrylic resin, polyvinyl alcohol, and coupling agent be baked onto the metal at a high temperature of approximately 200° C. on the antiseptic surface. By performing the organic primer treatment, the metal foil and the adhesive can be adhered more firmly, and the floating between the metal foil and the adhesive can be further suppressed.

[Heat Seal Layer]

The heat seal layer is not particularly limited, and is preferably an unstretched film made of at least one thermoplastic resin selected from the group consisting of polyethylene, polypropylene, olefinic copolymer, acid-modified products thereof, and ionomer. Although the thickness of the heat seal layer is not particularly limited, the thickness of 20 to 150 μm is preferable.

[Inner Layer Side Adhesive Layer]

The adhesive that forms the inner layer side adhesive layer is not particularly limited, but it is preferable that the adhesive strength between the metal foil layer and the heat seal layer do not decrease due to the electrolytic solution of the electrical storage device, and known adhesives can be used in addition to the adhesive for an electrical storage device packaging material of the disclosure.

The inner layer side adhesive layer can be formed by, for example, coating the metal foil layer with an adhesive that is a combination of polyolefin resin and polyisocyanate or an adhesive that is a combination of polyol and polyisocyanate using a gravure coater or the like, and drying the solvent, by superimposing the heat seal layer on the adhesive layer under heat and pressure, and then aging the heat seal layer at room temperature or under heat.

Alternatively, the inner layer side adhesive layer can be formed by melting and extruding an adhesive such as acid-modified polypropylene onto the metal foil layer with a T-die extruder to form an adhesive layer, superimposing a heat seal layer on the adhesive layer, and bonding the metal foil layer and the heat seal layer.

When both the outer layer side adhesive layer and the inner layer side adhesive layer require aging, after obtaining the laminated body having a configuration in which the outer layer side resin film layer, the uncured outer layer side adhesive layer, the metal foil layer, the uncured inner layer side adhesive layer, and the heat seal layer are laminated in this order from the outside, aging may be performed collectively.

<Electrical Storage Device Container>

The electrical storage device container of the disclosure can be obtained by performing molding such that the outer layer side resin film layer forms a convex surface and the heat seal layer forms a concave surface using the electrical storage device packaging material of the disclosure. In addition, the term "concave surface" as used in the disclosure means a surface having a recess capable of accommodating an electrolytic solution therein when the flat electrical storage device packaging material is molded into a tray shape, and the term "convex surface" as used in the disclosure means the back surface of the surface having the recess.

<Electrical Storage Device>

The electrical storage device of the disclosure is formed by using the electrical storage device container, and examples thereof include secondary batteries such as lithium-ion batteries, nickel-hydrogen batteries, and lead-acid batteries, and electrochemical capacitors such as electric double layer capacitors.

A typical electrical storage device includes a container that accommodates a battery element including electrodes and leads extending from the electrodes, and in the electrical storage device of the disclosure, the electrical storage device container is used as the container for housing. The container for housing may be formed from the electrical storage device packaging material such that the heat seal layer becomes the inner side, and may be obtained by superimposing the heat seal layers of the two packaging materials such that the heat seal layers face each other and by heat-sealing peripheral edge parts of the superimposed packaging materials, or may be obtained by folding back and superimposing one packaging material and by heat-sealing peripheral edge parts of the packaging material in the same manner.

EXAMPLES

The disclosure will now be described more specifically with reference to examples and comparative examples. "Parts" and "%" in examples and comparative examples mean "parts by mass" and "% by mass" unless otherwise specified.

<Measurement of Acid Value (AV)>

Approximately 1 g of a sample (polyester polyol solution) was accurately weighed in a stoppered Erlenmeyer flask, and dissolved by adding 100 ml of a toluene/ethanol (volume ratio: toluene/ethanol=2/1) mixture. A phenolphthalein test solution was added to this as an indicator and held for 30 seconds. Thereafter, the solution was titrated with a 0.1 N alcoholic potassium hydroxide solution until the solution turned light pink, and the acid value (mgKOH/g) was determined by the following formula.

$$\text{Acid value (mgKOH/g)} = (5.611 \times a \times F)/S$$

Here, S: sample collection amount (g)

a: consumption amount of 0.1 N alcoholic potassium hydroxide solution (ml)

F: titer of 0.1 N alcoholic potassium hydroxide solution

<Measurement of Hydroxyl Value (OHV)>

Approximately 1 g of a sample (polyester polyol, hydroxyl group-containing urethane resin, or the like) was accurately weighed in a stoppered Erlenmeyer flask, and dissolved by adding 100 ml of a toluene/ethanol (volume ratio: toluene/ethanol=2/1) mixture. Exactly 5 ml of an acetylating agent (a solution of 25 g of acetic anhydride dissolved in pyridine to the volume of 100 ml) was further added and stirred for approximately 1 hour. A phenolphthalein test solution was added to this as an indicator and maintained for 30 seconds. Thereafter, the solution was titrated with a 0.1 N alcoholic potassium hydroxide solution until the solution turned light pink, and the hydroxyl value (mgKOH/g) was determined by the following formula.

$$\text{Hydroxyl value (mgKOH/g)} = [\{(b-a) \times F \times 28.05\}/S] + D$$

Here, S: sample collection amount (g)

a: consumption amount of 0.1 N alcoholic potassium hydroxide solution (ml)

b: consumption amount of 0.1 N alcoholic potassium hydroxide solution in blank experiment (ml)

F: titer of 0.1 N alcoholic potassium hydroxide solution

D: acid value (mgKOH/g)

<Measurement of Weight Average Molecular Weight (Mw), Number Average Molecular Weight (Mn), and Molecular Weight Distribution (Mw/Mn)>

The average molecular weight and the molecular weight distribution were determined by using a value converted to standard polystyrene, which was measured while a column temperature was 40° C., THF was used an eluent, a flow rate was 0.2 ml/min, RI was for detection, and a sample concentration was 0.02% by mass, using Shodex (manufactured by Showa Denko K.K.) and Columns: KF-805L, KF-803L, and KF-802 (manufactured by Showa Denko K.K).

<Glass Transition Point (Tg)>

The glass transition point was measured by differential scanning calorimetry (DSC). Specifically, approximately 2 mg of the compound to be measured was weighed on an aluminum pan, the aluminum pan was set on a DSC measurement holder, the endothermic peak of the chart obtained at a temperature increase of 5° C./min was read, and the peak temperature at that time was taken as the glass transition point.

<Synthesis of Polyester Polyol>

(Polyester (a)-1)

126.7 parts of isophthalic acid, 272.9 parts of dimethyl terephthalic acid, 347.7 parts of azelaic acid, and 252.7 parts of ethylene glycol were charged, and an esterification reaction was performed at 170 to 230° C. for 10 hours. After distilling a predetermined amount of water, 0.05 parts of tetraisobutyl titanate was added and the pressure was gradually reduced, a transesterification reaction was performed at 1.3 to 2.6 hPa and 230 to 250° C. for 3 hours, and a polyester polyol having a number average molecular weight of 33,000, a weight average molecular weight of 76,000, a molecular weight distribution of 2.30, a hydroxyl value of 3.66 mgKOH/g, an acid value of 0.2 mgKOH/g, and a glass transition point of −5° C. was obtained with a yield of 86.4%.

Assuming that the excess hydroxyl group component was distilled off almost uniformly, and the total of the polybasic acid component and the polyhydric alcohol component was 200% by mol, the composition of the obtained polyester (a)-1 was isophthalic acid:dimethyl terephthalic acid:azelaic acid:ethylene glycol=19:35:46:100 (% by mol).

Ethyl acetate was added to dilute this to obtain a polyester (a)-1 solution having a non-volatile content of 50%.

(Polyester (a)-2)

126.8 parts of isophthalic acid, 273.3 parts of dimethyl terephthalic acid, 348.2 parts of azelaic acid, and 251.6 parts of ethylene glycol were charged, and an esterification reaction was performed at 170 to 230° C. for 10 hours. After distilling a predetermined amount of water, 0.05 parts of tetraisobutyl titanate was added and the pressure was gradually reduced, a transesterification reaction was performed at 1.3 to 2.6 hPa and 230 to 250° C. for 5 hours, and a polyester polyol having a number average molecular weight of 48,000, a weight average molecular weight of 120,000, a molecular weight distribution of 2.50, a hydroxyl value of 2.19 mgKOH/g, an acid value of 0.2 mgKOH/g, and a glass transition point of –2° C. was obtained with a yield of 86.0%.

Assuming that the excess hydroxyl group component was distilled off almost uniformly, and the total of the polybasic acid component and the polyhydric alcohol component was 200% by mol, the composition of the obtained polyester (a)-2 was isophthalic acid:dimethyl terephthalic acid:azelaic acid:ethylene glycol=19:35:46:100 (% by mol).

Ethyl acetate was added to dilute this to obtain a polyester (a)-2 solution having a non-volatile content of 50%.

(Polyester (a)-3)

231.3 parts of orthophthalic acid, 231.3 parts of terephthalic acid, 174.4 parts of adipic acid, 90.7 parts of ethylene glycol, 66.5 parts of diethylene glycol, 130.4 parts of neopentyl glycol, and 75.4 parts of 2-methyl-1,3-propanediol were charged and an esterification reaction was performed at 170 to 230° C. for 6 hours. After distilling a predetermined amount of water, 0.05 parts of tetraisobutyl titanate was added and the pressure was gradually reduced, a transesterification reaction was performed at 1.3 to 2.6 hPa and 230 to 250° C. for 3 hours, and a polyester polyol having a number average molecular weight of 9,600, a weight average molecular weight of 20,000, a molecular weight distribution of 2.08, a hydroxyl value of 12.26 mgKOH/g, an acid value of 0.2 mgKOH/g, and a glass transition point of –3° C. was obtained with a yield of 84.7%. Assuming that the excess hydroxyl group component was distilled off almost uniformly, and the total of the polybasic acid component and the polyhydric alcohol component was 200% by mol, the composition of the obtained polyester (a)-3 was orthophthalic acid:terephthalic acid:adipic acid:ethylene glycol:diethylene glycol:neopentyl glycol:2-methyl-1,3-propanediol=35:35:30:35:15:30:20 (% by mol).

(Polyester (a)-4)

289.3 parts of isophthalic acid, 352.1 parts of sebacic acid, 59.4 parts of ethylene glycol, and 299.1 parts of neopentyl glycol were charged, and an esterification reaction was performed at 170 to 230° C. for 6 hours. After distilling a predetermined amount of water, 0.05 parts of tetraisobutyl titanate was added and the pressure was gradually reduced, a transesterification reaction was performed at 1.3 to 2.6 hPa and 230 to 250° C. for 3 hours, and a polyester polyol having a number average molecular weight of 2,600, a weight average molecular weight of 5,700, a molecular weight distribution of 2.19, a hydroxyl value of 43.2 mgKOH/g, an acid value of 0.2 mgKOH/g, and a glass transition point of –18° C. was obtained with a yield of 84.7%. Assuming that the excess hydroxyl group component was distilled off almost uniformly, and the total of the polybasic acid component and the polyhydric alcohol component was 200% by mol, the composition of the obtained polyester (a)-4 was isophthalic acid:sebacic acid:ethylene glycol:neopentyl glycol=50:50:25:75 (% by mol).

(Polyester (a)-5)

211.0 parts of orthophthalic acid, 140.7 parts of terephthalic acid, 309.3 parts of adipic acid, 133.3 parts of ethylene glycol, 89.5 parts of neopentyl glycol, and 116.3 parts of 2-methyl-1,3-propanediol were charged and an esterification reaction was performed at 170 to 230° C. for 10 hours. After distilling a predetermined amount of water, 0.05 parts of tetraisobutyl titanate was added and the pressure was gradually reduced, a transesterification reaction was performed at 1.3 to 2.6 hPa and 230 to 250° C. for 3 hours, and a polyester polyol having a number average molecular weight of 29,000, a weight average molecular weight of 64,000, a molecular weight distribution of 2.21, a hydroxyl value of 3.94 mgKOH/g, an acid value of 0.3 mgKOH/g, and a glass transition point of –4° C. was obtained with a yield of 83.7%.

Assuming that the excess hydroxyl group component was distilled off almost uniformly, and the total of the polybasic acid component and the polyhydric alcohol component was 200% by mol, the composition of the obtained polyester (a)-5 was orthophthalic acid:terephthalic acid:adipic acid:ethylene glycol:neopentyl glycol:2-methyl-1,3-propanediol=30:20:50:50:20:30 (% by mol).

(Polyester (a)-6)

229.5 parts of isophthalic acid, 418.9 parts of sebacic acid, 21.8 parts of ethylene glycol, 74.4 parts of diethylene glycol, and 255.4 parts of neopentyl glycol were charged, and an esterification reaction was performed at 170 to 230° C. for 10 hours. After distilling a predetermined amount of water, 0.05 parts of tetraisobutyl titanate was added and the pressure was gradually reduced, a transesterification reaction was performed at 1.3 to 2.6 hPa and 230 to 250° C. for 3 hours, and a polyester polyol having a number average molecular weight of 27,000, a weight average molecular weight of 61,000, a molecular weight distribution of 2.26, a hydroxyl value of 4.02 mgKOH/g, an acid value of 0.4 mgKOH/g, and a glass transition point of –20° C. was obtained with a yield of 84.1%.

Assuming that the excess hydroxyl group component was distilled off almost uniformly, and the total of the polybasic acid component and the polyhydric alcohol component was 200% by mol, the composition of the obtained polyester (a)-6 was isophthalic acid:sebacic acid:ethylene glycol:diethylene glycol:neopentyl glycol=40:60:10:20:70 (% by mol).

(Polyester (a)-7)

305.5 parts of isophthalic acid, 122.2 parts of terephthalic acid, 223.0 parts of sebacic acid, 57.9 parts of ethylene glycol, and 291.4 parts of neopentyl glycol were charged, and an esterification reaction was performed at 170 to 230° C. for 10 hours. After distilling a predetermined amount of water, 0.05 parts of tetraisobutyl titanate was added and the pressure was gradually reduced, a transesterification reaction was performed at 1.3 to 2.6 hPa and 230 to 250° C. for 3 hours, and a polyester polyol having a number average molecular weight of 28,000, a weight average molecular weight of 61,000, a molecular weight distribution of 2.18, a hydroxyl value of 3.88 mgKOH/g, an acid value of 0.4 mgKOH/g, and a glass transition point of –12° C. was obtained with a yield of 83.3%.

Assuming that the excess hydroxyl group component was distilled off almost uniformly, and the total of the polybasic acid component and the polyhydric alcohol component was 200% by mol, the composition of the obtained polyester (a)-7 was isophthalic acid:terephthalic acid: sebacic acid: ethylene glycol:neopentyl glycol=50:20:30:25:75 (% by mol).

(Polyester (a)-8)

208.6 parts of orthophthalic acid, 139.0 parts of terephthalic acid, 305.7 parts of adipic acid, 136.3 parts of ethylene glycol, 91.5 parts of neopentyl glycol, and 118.9 parts of 2-methyl-1,3-propanediol were charged and an esterification reaction was performed at 170 to 230° C. for 3 hours. After distilling a predetermined amount of water, 0.05 parts of tetraisobutyl titanate was added and the pressure was gradually reduced, a transesterification reaction was performed at 1.3 to 2.6 hPa and 230 to 250° C. for 3 hours, and a polyester polyol having a number average molecular weight of 9,300, a weight average molecular weight of 20,000, a molecular weight distribution of 2.15, a hydroxyl value of 12.9 mgKOH/g, an acid value of 0.2 mgKOH/g, and a glass transition point of −9° C. was obtained with a yield of 83.9%.

Assuming that the excess hydroxyl group component was distilled off almost uniformly, and the total of the polybasic acid component and the polyhydric alcohol component was 200% by mol, the composition of the obtained polyester (a)-8 was orthophthalic acid:terephthalic acid:adipic acid:

ethylene glycol:neopentyl glycol:2-methyl-1,3-propanediol=30:20:50:50:20:30 (% by mol).

(Polyester (a)-9)

301.8 parts of isophthalic acid, 120.7 parts of terephthalic acid, 220.4 parts of sebacic acid, 59.2 parts of ethylene glycol, and 297.8 parts of neopentyl glycol were charged, and an esterification reaction was performed at 170 to 230° C. for 3 hours. After distilling a predetermined amount of water, 0.05 parts of tetraisobutyl titanate was added and the pressure was gradually reduced, a transesterification reaction was performed at 1.3 to 2.6 hPa and 230 to 250° C. for 3 hours, and a polyester polyol having a number average molecular weight of 11,000, a weight average molecular weight of 22,000, a molecular weight distribution of 2.00, a hydroxyl value of 11.1 mgKOH/g, an acid value of 0.3 mgKOH/g, and a glass transition point of −16° C. was obtained with a yield of 83.5%.

Assuming that the excess hydroxyl group component was distilled off almost uniformly, and the total of the polybasic acid component and the polyhydric alcohol component was 200% by mol, the composition of the obtained polyester (a)-9 was isophthalic acid:terephthalic acid: sebacic acid: ethylene glycol:neopentyl glycol=50:20:30:25:75 (% by mol).

TABLE 1

| | Polybasic acid component | | | | | | | Polyhydric alcohol component | | | | Yield | Ester bond concentration mmol/g | Hydroxyl value mgKOH/g | Acid value mgKOH/g | Molecular weight | | | Tg (° C.) |
| | Aromatic | | | | Aliphatic | | | | | | | | | | | Mn | Mw | Mw/Mn | |
| | OPA | IPA | TPA | DMT | AdA | SbA | AzA | EG | NGP | MPO | DEG | | | | | | | | |
| Polyester (a)-1 | | 19 | | 35 | | | 46 | 100 | | | | 86.4% | 9.30 | 3.7 | 0.2 | 33,000 | 76,000 | 2.30 | −5 |
| Polyester (a)-2 | | 19 | | 35 | | | 46 | 100 | | | | 86.0% | 9.35 | 2.2 | 0.2 | 48,000 | 120,000 | 2.50 | −2 |
| Polyester (a)-3 | 35 | | 35 | | 30 | | | 35 | 30 | 20 | 15 | 84.7% | 9.40 | 12.3 | 0.2 | 9,600 | 20,000 | 2.08 | −3 |
| Polyester (a)-4 | | 50 | | | | 50 | | 25 | 75 | | | 84.7% | 8.23 | 43.2 | 0.2 | 2,600 | 5,700 | 2.19 | −18 |
| Polyester (a)-5 | 30 | | 20 | | 50 | | | 50 | 20 | 30 | | 83.7% | 10.13 | 3.9 | 0.3 | 29,000 | 64,000 | 2.21 | −4 |
| Polyester (a)-6 | | 40 | | | | 60 | | 10 | 70 | | 20 | 84.1% | 8.22 | 4.0 | 0.4 | 27,000 | 61,000 | 2.26 | −20 |
| Polyester (a)-7 | | 50 | 20 | | | 30 | | 25 | 75 | | | 83.3% | 8.84 | 3.9 | 0.4 | 28,000 | 61,000 | 2.18 | −12 |
| Polyester (a)-8 | 30 | | 20 | | 50 | | | 50 | 20 | 30 | | 83.9% | 9.99 | 12.9 | 0.2 | 9,300 | 20,000 | 2.15 | −9 |
| Polyester (a)-9 | | 50 | 20 | | | 30 | | 25 | 75 | | | 83.5% | 8.71 | 11.1 | 0.3 | 11,000 | 22,000 | 2.00 | −16 |

Abbreviations in Table 1 are as follows.
OPA: orthophthalic acid
IPA: isophthalic acid
TPA: terephthalic acid
DMT: dimethyl terephthalic acid
AdA: adipic acid
SbA: sebacic acid
AzA: azelaic acid
EG: ethylene glycol
NGP: neopentyl glycol
MPO: 2-methyl-1,3-propanediol
DEG: diethylene glycol <Synthesis of Polyester Urethane Polyol>
(Urethane (b)-1)

100 parts of the obtained polyester (a)-3 and 43 parts of ethyl acetate were charged into a four-necked flask, heated to 85° C., and stirred until the solution became uniform. To this, 2.5 parts of tolylene diisocyanate and 0.02 parts of dibutyltin dilaurate were added and reacted for 4 hours. After the completion of the reaction, 59 parts of ethyl acetate is added to obtain the urethane (b)-1 solution which is a solution of polyester urethane polyol having a weight average molecular weight of 74,000, a glass transition point of 6° C., a hydroxyl value of 3.4 mgKOH/g, and a non-volatile content of 50%.

(Urethane (b)-2)

100 parts of the obtained polyester (a)-3 and 43 parts of ethyl acetate were charged into a four-necked flask, heated solution of polyester urethane polyol having a weight average molecular weight of 91,000, a glass transition point of 1° C., a hydroxyl value of 3.0 mgKOH/g, and a non-volatile content of 50%.

(Urethane (b)-5)

100 parts of the obtained polyester (a)-9 and 43 parts of ethyl acetate were charged into a four-necked flask, heated to 85° C., and stirred until the solution became uniform. To this, 2.5 parts of tolylene diisocyanate and 0.02 parts of dibutyltin dilaurate were added and reacted for 4 hours. After the completion of the reaction, 59 parts of ethyl acetate is added to obtain the urethane (b)-5 solution which is a solution of polyester urethane polyol having a weight average molecular weight of 87,000, a glass transition point of −8° C., a hydroxyl value of 3.0 mgKOH/g, and a non-volatile content of 50%.

TABLE 2

| | Polyol component | | Isocyanate component | | Ester bond concentration | Urethane bond concentration | Molecular weight | | | Tg | Hydroxyl value |
|---|---|---|---|---|---|---|---|---|---|---|---|
| | Type | Parts | Type | Parts | mmol/g | mmol/g | Mn | Mw | Mw/Mn | (° C.) | mgKOH/g |
| Urethane (b)-1 | Polyester (a)-3 | 100 | TDI | 2.5 | 9.17 | 0.28 | 31,000 | 74,000 | 2.4 | 6 | 3.4 |
| Urethane (b)-2 | Polyester (a)-3 | 100 | TDI | 3.0 | 9.13 | 0.33 | 47,500 | 122,000 | 2.6 | 11 | 1.6 |
| Urethane (b)-3 | Polyester (a)-4 | 100 | TDI | 7.3 | 7.67 | 0.78 | 19,800 | 41,000 | 2.1 | −9 | 7.7 |
| Urethane (b)-4 | Polyester (a)-8 | 100 | TDI | 2.5 | 9.75 | 0.28 | 37,000 | 91,000 | 2.5 | 1 | 3.0 |
| Urethane (b)-5 | Polyester (a)-9 | 100 | TDI | 2.5 | 8.50 | 0.28 | 34,000 | 87,000 | 2.6 | −8 | 3.0 |

Abbreviations in Table 2 are as follows.
TDI: tolylene diisocyanate to 85° C., and stirred until the solution became uniform. To this, 3.0 parts of tolylene diisocyanate and 0.02 parts of dibutyltin dilaurate were added and reacted for 4 hours. After the completion of the reaction, 59 parts of ethyl acetate was added to obtain the urethane (b)-2 solution which is a solution of polyester urethane polyol having a weight average molecular weight of 122,000, a glass transition point of 11° C., a hydroxyl value of 1.6 mgKOH/g, and a non-volatile content of 50%.

(Urethane (b)-3)

100 parts of the obtained polyester (a)-4 and 43 parts of ethyl acetate were charged into a four-necked flask, heated to 85° C., and stirred until the solution became uniform. To this, 7.3 parts of tolylene diisocyanate and 0.02 parts of dibutyltin dilaurate were added and reacted for 4 hours. After the completion of the reaction, 65 parts of ethyl acetate is added to obtain the urethane (b)-3 solution which is a solution of polyester urethane polyol having a weight average molecular weight of 41,000, a glass transition point of −9° C., a hydroxyl value of 7.7 mgKOH/g, and a non-volatile content of 50%.

(Urethane (b)-4)

100 parts of the obtained polyester (a)-8 and 43 parts of ethyl acetate were charged into a four-necked flask, heated to 85° C., and stirred until the solution became uniform. To this, 2.5 parts of tolylene diisocyanate and 0.02 parts of dibutyltin dilaurate were added and reacted for 4 hours. After the completion of the reaction, 59 parts of ethyl acetate is added to obtain the urethane (b)-4 solution which is a <Manufacturing of Adhesive For Electrical Storage Device>

Example 1

After 200 parts of polyester (a)-1 solution (100 parts in terms of solid content), 67 parts of JER1002 (manufactured by Mitsubishi Chemical Corporation, bisphenol A type epoxy resin, epoxy equivalent weight 600 to 700 [g/eq]), and 1 part of KBM-403 (manufactured by Shin-Etsu Chemical Co., Ltd., silane coupling agent) were charged, and stirred for 10 minutes, 14 parts (10 parts in terms of solid content) of CAT-RT1 (manufactured by Toyo-Morton, Ltd., aliphatic polyisocyanate, solid content concentration 70%) were charged and diluted with ethyl acetate to prepare an adhesive with a solid concentration of 25%.

Examples 2 to 26, Comparative Examples 1 to 7

An adhesive was manufactured in the same manner as in Example 1, except that the composition was changed to those shown in Tables 3 and 4.

<Evaluation of Adhesive For Electrical Storage Device>

The following evaluations were performed on the obtained adhesives for an electrical storage device. Tables 3 and 4 show the results.

[Stress Relaxation Rate of Cured Film]

An unstretched polypropylene film that was subjected to corona treatment was coated with the obtained adhesive for an electrical storage device such that the cured film had a thickness of 40 μm, and was cured at 80° C. for 2 weeks. The cured film was peeled off from the film and cut to a width of 5 mm and a length of 20 mm to prepare a sample for measurement.

In an environment of 20° C. and 65% RH, both ends of the sample for measurement in the longitudinal direction were gripped with a jig, and a tensile load was applied at a tensile rate of 6 mm/min to stretch the sample using a tensile tester. When the sample for measurement was stretched to twice the initial length, the tensile rate was changed to 0.0 mm/min and held as it was for 100 seconds.

The load value (stress S1 [$N/mm^2$]) when the length is doubled, and the load value (stress S2 [$N/mm^2$]) when held for 100 seconds in a stretched state are measured, and a value of $(S1-S2)/S1\times100$ was calculated. No data (-) was given when the stresses S1 and S2 could not be measured because the length was not doubled.

[Storage Elastic Modulus of Cured Film]

A cured film was obtained in the same manner as in the stress relaxation rate measurement, and cut into a width of 5 mm and a length of 3 cm to prepare a sample for measurement. A sample for measurement was held in a dynamic viscoelasticity measurement device (DVA-200, manufactured by IT Keisoku Seigyo Co. Ltd.) such that the distance between chucks was 2 cm, the storage elastic modulus in the range of −50° C. to 200° C. was measured under the condition of a temperature rise rate of 10° C./min and a frequency of 10 Hz, and a value of the storage elastic modulus at 120° C. was measured.

[Manufacturing of Electrical Storage Device Packaging Material 1]

One surface of an aluminum foil having a thickness of 40 μm was coated with a coating type phosphoric acid chromate treatment agent (SURFCOAT NR-X manufactured by Nippon Paint Holdings Co., Ltd.) at a coating amount of 0.03 $g/m^2$ and baked at 230° C. Thereafter, using a dry laminator, the surface of the aluminum foil subjected to the surface treatment was coated with the obtained adhesive for an electrical storage device as an outer layer side adhesive layer, and the solvent was volatilized. After this, an intermediate laminated body was obtained by laminating stretched polyamide film having a thickness of 25 μm. The coating amount of the adhesive after drying was 3 $g/m^2$.

Next, using a dry laminator, the other surface of the aluminum foil of the obtained intermediate laminated body was coated with an adhesive for an inner layer side adhesive layer, which will be described later, and the solvent was volatilized. After this, a laminated body was obtained by laminating an unstretched polypropylene film having a thickness of 25 μm. The coating amount of the adhesive after drying was 3 $g/m^2$. Next, aging was performed at 60° C. for 5 days to cure the adhesive layers on the outer layer side and the inner layer side, and an electrical storage device packaging material 1 having a configuration of the outer layer side resin film layer/outer layer side adhesive layer/metal foil layer/inner layer side adhesive layer/heat seal layer was obtained.

(Adhesive For Inner Layer Side Adhesive Layer)

An adhesive obtained by performing incorporation such that the main agent/curing agent=100/10 (mass ratio) using AD-502 (polyester polyol manufactured by Toyo-Morton, Ltd.) as a main agent and CAT-10L (isocyanate-based curing agent manufactured by Toyo-Morton, Ltd.) as a curing agent and by adjusting the solid content concentration to 25% with ethyl acetate as the curing agent, was used as the adhesive for an inner layer side adhesive layer.

[Manufacturing of Electrical Storage Device Packaging Material 2]

An electrical storage device packaging material 2 was obtained in the same manner as the electrical storage device packaging material 1 except that the stretched polyamide film having a thickness of 25 μm was changed to a stretched polybutylene terephthalate film having a thickness of 25 μm.

[120° C. Hot Strength]

The electrical storage device packaging material 1 was cut into a size of 200 mm×15 mm, and a T-type peel test was performed using a tensile tester to measure the peel strength (N/15 mm width) between the stretched polyamide film and the aluminum foil. The measurement was performed at a load rate of 50 mm/min in an environment of 120° C., and the average value of three test pieces was evaluated according to the following criteria.

S: the average value of peel strength is 5.0 N or more (very good)

A: the average value of peel strength is 4.0 N or more and less than 5.0 N (good)

B: the average value of peel strength is 3.0 N or more and less than 4.0 N (usable)

C: the average value of peel strength is less than 3.0 N (cannot be used)

[Wet Heat Durability of Molded Product]

The electrical storage device packaging material 1 was cut into a size of 60×60 mm to obtain a blank. With respect to the blank, one-stage overhang molding at a molding height of 5 mm using a straight mold with a free molding height was performed while the stretched polyamide film is on the outer side, to obtain a molded product. Three molded products were prepared. Next, the three molded products were placed in a temperature and humidity testing chamber under an atmosphere of 85° C. and 85% RH, removed from the temperature and humidity testing chamber after 500 hours, visually checked whether or not floating occurred, and evaluated according to the standard.

S: 0 samples with floating (very good)

A: 1 sample with floating (good)

B: 2 samples with floating (usable)

C: 3 samples with floating (cannot be used)

[High Temperature Durability of Molded Product]

Except that the electrical storage device packaging material 1 was changed to the electrical storage device packaging material 2 and the standing condition was changed from 85° C. and 85% RH to 150° C., in the same manner as in the evaluation of [Wet heat durability of molded product], the occurrence of floating was visually confirmed and evaluated according to the following criteria.

S: 0 samples with floating (very good)

A: 1 sample with floating (good)

B: 2 samples with floating (usable)

C: 3 samples with floating (cannot be used)

[Heat Seal Resistance of Deformed Molded Product]

With respect to the electrical storage device packaging material 1, one-stage overhang molding at a molding height of 5 mm was performed in the same manner as in [Wet heat durability of molded product]. Next, after the center of the overhang of the molded product was directly depressed, and four overhanging corners were deformed by adding valley fold wrinkles, four surfaces of the flange were heat-sealed at each temperature at 2 kgf for 5 seconds. Evaluation was performed according to the following four grades according to the maximum temperature at which the floating between layers did not occur.

S: No floating at 210° C. (very good)

A: No floating at 200° C., floating at 210° C. (good)

B: No floating at 190° C., floating at 200° C. (usable)

C: Floating at 190° C. (cannot be used)

[Deep Drawing Moldability]

After coating both sides of the electrical storage device packaging material 1 with 0.02 $g/m^2$ of erucamide, the material was cut into a size of 60×60 mm to obtain a blank. With respect to the blank, one-stage overhang molding using a straight mold with a free molding height was performed while the stretched polyamide film is on the outer side, moldability was evaluated according to the following criteria based on the maximum molding height that does not cause breakage of the aluminum foil or floating between layers.

The punch shape of the mold used was a square with a side of 29.4 mm, a corner radius of 1 mm, and a punch shoulder radius of 1 mm. The shape of the die hole of the mold used was a square with a side of 30.0 mm, die hole corner radius of 1 mm, die hole shoulder radius of 1 mm, and the clearance between the punch and the die hole of 0.3 mm. The clearance causes an inclination according to the molding height. The following four grades were evaluated according to the height of molding.

S: the maximum molding height is 7 mm or more (very good)

A: the maximum molding height is 6 mm or more and less than 7 mm (good)

B: the maximum molding height is 5 mm or more and less than 6 mm (usable)

C: the maximum molding height is less than 5 mm (cannot be used)

| | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Polyol compound (A) | Type | Polyester (a)-1 | Polyester (a)-1 | Polyester (a)-1 | Polyester (a)-1 | Polyester (a)-1 | Polyester (a)-2 | Urethane (b)-1 | Urethane (b)-1 | Urethane (b)-1 | Urethane (b)-1 | Urethane (b)-1 | Urethane (b)-1 |
| | Mw | 76,000 | 76,000 | 76,000 | 76,000 | 76,000 | 120,000 | 74,000 | 74,000 | 74,000 | 74,000 | 74,000 | 74,000 |
| | OHV (mgKOH/g) | 3.7 | 3.7 | 3.7 | 3.7 | 3.7 | 2.2 | 3.4 | 3.4 | 3.4 | 3.4 | 3.4 | 3.4 |
| | Tg (°C.) | -5 | -5 | -5 | -5 | -5 | -2 | 6 | 6 | 6 | 6 | 6 | 6 |
| | Ester bond concentration (mmol/g) | 9.30 | 9.30 | 9.30 | 9.30 | 9.30 | 9.35 | 9.17 | 9.17 | 9.17 | 9.17 | 9.17 | 9.17 |
| | Urethane bond concentration (mmol/g) | — | — | — | — | — | — | 0.28 | 0.28 | 0.28 | 0.28 | 0.28 | 0.28 |
| | Parts by mass (in terms of solid content) | 100 | 100 | 100 | 100 | 100 | 100 | 100 | 100 | 100 | 100 | 100 | 100 |
| Epoxy compound (C) | Type | EP1 | EP1 | EP1 | EP1 | EP1 | EP1 | EP2 | EP2 | EP2 | EP2 | EP2 | EP2 |
| | Epoxy equivalent weight (g/eq) | 650 | 650 | 650 | 650 | 650 | 650 | 250 | 250 | 250 | 250 | 250 | 250 |
| | Parts by mass (in terms of solid content) | 67 | 67 | 67 | 43 | 67 | 67 | 25 | 3 | 45 | 11 | 25 | 25 |
| Polyisocyanate compound (B) | Type | CAT1 | CAT1 | CAT1 | CAT1 | CAT2 | CAT1 | CAT2 | CAT2 | CAT2 | CAT2 | CAT1 | CAT2 |
| | Parts by mass (in terms of solid content) | 10 | 14 | 28 | 28 | 35 | 28 | 35 | 35 | 35 | 47 | 28 | 21 |
| Other components | Silane coupling agent | SC-1 | SC-1 | SC-1 | SC-1 | SC-1 | SC-1 | SC-1 | SC-1 | SC-1 | SC-1 | SC-1 | SC-1 |
| | Parts by mass (in terms of solid content) | 1 | 1 | 1 | 1 | 1 | 1 | 1 | 1 | 1 | 1 | 1 | 1 |
| Cured film | (S1 − S2)/S1 × 100 | 35.0 | 25.5 | 12.0 | 12.4 | 14.5 | 10.5 | 17.2 | 20.1 | 10.8 | 19.0 | 19.7 | 29.0 |
| | 120° C. storage elastic modulus (Pa) | 2.20E+05 | 1.94E+06 | 1.45E+07 | 2.30E+07 | 2.42E+07 | 8.72E+07 | 2.62E+07 | 9.77E+07 | 5.22E+06 | 9.72E+07 | 5.79E+06 | 2.08E+06 |
| | 120° C. hot | B | A | S | S | S | A | S | S | A | S | S | A |

-continued

| | | Example 13 | Example 14 | Example 15 | Example 16 | Example 17 | Example 18 | Example 19 | Comparative Example 1 | Comparative Example 2 | Comparative Example 3 | Comparative Example 4 |
|---|---|---|---|---|---|---|---|---|---|---|---|---|
| | strength | B | A | A | A | A | B | S | A | A | S | A |
| | Wet heat durability of molded product | B | A | S | A | A | A | A | B | B | A | A |
| | High temperature durability of molded product | A | S | S | S | S | S | S | A | A | S | A |
| | Heat seal resistance of deformed molded product | A | A | A | A | A | B | S | A | A | S | A |
| | Deep drawing moldability | B | A | A | A | A | B | S | S | S | S | A |
| Polyol compound (A) | Type | Urethane (b)-1 | Urethane (b)-1 | Urethane (b)-1 | Urethane (b)-1 | Urethane (b)-1 | Urethane (b)-1 | Urethane (b)-2 | Polyester (a)-1 | Urethane (b)-1 | Urethane (b)-3 | Urethane (b)-1 |
| | Mw | 74,000 | 74,000 | 74,000 | 74,000 | 74,000 | 74,000 | 122,000 | 76,000 | 74,000 | 41,000 | 74,000 |
| | OHV (mgKOH/g) | 3.4 | 3.4 | 3.4 | 3.4 | 3.4 | 3.4 | 1.6 | 3.7 | 3.4 | 7.7 | 3.4 |
| | Tg (° C.) | 6 | 6 | 6 | 6 | 6 | 6 | 1 | −5 | 6 | −9 | 6 |
| | Ester bond concentration (mmol/g) | 9.17 | 9.17 | 9.17 | 9.17 | 9.17 | 9.17 | 9.13 | 9.30 | 9.17 | 7.67 | 9.17 |
| | Urethane bond concentration (mmol/g) | 0.28 | 0.28 | 0.28 | 0.28 | 0.28 | 0.28 | 0.33 | — | 0.28 | 0.78 | 0.28 |
| | Parts by mass (in terms of solid content) | 100 | 100 | 100 | 100 | 100 | 100 | 100 | 100 | 100 | 100 | 100 |
| Epoxy compound (C) | Type | EP2 | EP3 | EP4 | EP5 | EP6 | EP7 | EP2 | EP1 | EP1 | EP1 | EP8 |
| | Epoxy equivalent weight (g/eq) | 250 | 218 | 210 | 120 | 430 | 475 | 250 | 650 | 650 | 650 | 80 |
| | Parts by mass (in terms of solid content) | 25 | 25 | 25 | 25 | 25 | 25 | 25 | 67 | 25 | 30 | 25 |
| Polyisocyanate compound (B) | Type | CAT2 | CAT2 | CAT2 | CAT2 | CAT2 | CAT2 | CAT2 | CAT1 | CAT2 | CAT2 | CAT2 |
| | Parts by mass (in terms of | 10 | 35 | 35 | 35 | 35 | 35 | 35 | 56 | 35 | 12 | 35 |

-continued

| | | | | | | | | | | | |
|---|---|---|---|---|---|---|---|---|---|---|---|
| Other components Silane coupling agent (solid content) | SC-1 | SC-1 | SC-1 | SC-1 | SC-1 | SC-1 | SC-1 | SC-1 | SC-1 | SC-1 | SC-1 |
| Parts by mass (in terms of solid content) | 1 | 1 | 1 | 1 | 1 | 1 | 1 | 1 | 1 | 1 | 1 |
| Cured film (S1 − S2)/S1 × 100 | 38.5 | 16.4 | 15.4 | 12.4 | 27.2 | 16.4 | 12.4 | — | 9.5 | 48.8 | 8.8 |
| 120° C. storage elastic modulus (Pa) | 3.22E+05 | 3.47E+07 | 4.35E+07 | 8.33E+07 | 2.73E+06 | 6.30E+07 | 9.72E+07 | 1.88E+08 | 1.94E+07 | 8.92E+04 | 9.53E+08 |
| 120° C. hot strength | B | S | S | A | A | B | A | C | C | C | C |
| Wet heat durability of molded product | A | S | S | S | S | S | A | C | B | C | B |
| High temperature durability of molded product | B | A | A | A | A | A | B | B | C | C | C |
| Heat seal resistance of deformed molded product | A | S | S | S | A | A | A | B | C | B | C |
| Deep drawing moldability | B | A | A | A | A | A | B | C | B | B | B |

| | | Example 20 | Example 21 | Example 22 | Example 23 | Example 24 | Example 25 | Example 26 | Comparative Example 5 | Comparative Example 6 | Comparative Example 7 |
|---|---|---|---|---|---|---|---|---|---|---|---|
| Polyol compound (A) | Type | Polyester (a)-5 | Polyester (a)-7 | Polyester (a)-1 | Polyester (a)-1 | Polyester (a)-1 | Urethane (b)-4 | Urethane (b)-5 | Polyester (a)-6 | Polyester (a)-1 | Polyester (a)-1 |
| | Mw | 64,000 | 61,000 | 76,000 | 76,000 | 76,000 | 91,000 | 87,000 | 61,000 | 76,000 | 76,000 |
| | OHV (mgKOH/g) | 3.9 | 3.9 | 3.7 | 3.7 | 3.7 | 3.0 | 3.0 | 4.0 | 3.7 | 3.7 |
| | Tg (°C.) | −4 | −12 | −5 | −5 | −5 | 1 | −8 | −20 | −5 | −5 |
| | Ester bond concentration (mmol/g) | 10.13 | 8.84 | 9.30 | 9.30 | 9.30 | 9.75 | 8.50 | 8.22 | 9.30 | 9.30 |
| | Urethane bond concentration (mmol/g) | — | — | — | — | — | 0.28 | 0.28 | — | — | — |
| | Parts by mass (in terms of solid content) | 100 | 100 | 100 | 100 | 100 | 100 | 100 | 100 | 100 | 100 |
| Epoxy compound (C) | Type | EP1 | EP1 | EP4 | EP7 | EP9 | EP2 | EP2 | EP1 | EP5 | EP10 |
| | Epoxy equivalent weight (g/eq) | 650 | 650 | 210 | 475 | 925 | 250 | 250 | 650 | 120 | 1075 |
| | Parts by mass (in terms of solid content) | 67 | 67 | 67 | 67 | 67 | 25 | 25 | 67 | 67 | 67 |
| Polyisocyanate compound (B) | Type | CAT1 | CAT1 | CAT1 | CAT1 | CAT1 | CAT2 | CAT2 | CAT1 | CAT1 | CAT1 |
| | Parts by mass (in terms of solid content) | 28 | 28 | 28 | 28 | 28 | 35 | 35 | 28 | 56 | 56 |
| Other components | Silane coupling agent | SC-1 | SC-1 | SC-1 | SC-1 | SC-1 | SC-1 | SC-1 | SC-1 | SC-1 | SC-1 |
| | Parts by mass (in terms of solid content) | 1 | 1 | 1 | 1 | 1 | 1 | 1 | 1 | 1 | 1 |
| Cured film | (S1 − S2)/S1 × 100 | 11.1 | 28.6 | 10.2 | 10.4 | 10.6 | 10.5 | 25.0 | 43.0 | 9.4 | — |
| | 120° C. storage elastic modulus (Pa) | 7.23E+07 | 9.74E+05 | 7.45E+07 | 8.81E+07 | 9.81E+07 | 9.42E+07 | 2.32E+06 | 3.21E+05 | 1.03E+08 | 1.23E+09 |
| 120° C. hot strength | | S | A | S | A | B | S | S | C | C | C |

-continued

| | Example 20 | Example 21 | Example 22 | Example 23 | Example 24 | Example 25 | Example 26 | Comparative Example 5 | Comparative Example 6 | Comparative Example 7 |
|---|---|---|---|---|---|---|---|---|---|---|
| Wet heat durability of molded product | B | A | A | A | B | A | A | B | B | C |
| High temperature durability of molded product | S | A | S | S | S | S | S | B | B | C |
| Heat seal resistance of deformed molded product | S | A | S | S | S | S | S | B | B | C |
| Deep drawing moldability | A | B | B | B | B | B | B | C | C | C |

Abbreviations in Tables 3 and 4 are as follows.

EP1: room temperature solid bisphenol A type epoxy resin (JER-1002, manufactured by Mitsubishi Chemical Corporation, epoxy equivalent weight 650 [g/eq])

EP2: room temperature liquid bisphenol A type epoxy resin (JER-834, manufactured by Mitsubishi Chemical Corporation, epoxy equivalent weight 250 [g/eq])

EP3: cresol novolac type epoxy resin (EOCN-104S, manufactured by Nippon Kayaku Co., Ltd., epoxy equivalent weight 218 [g/eq])

EP4: bisphenol A novolac type epoxy resin (JER-157S70, manufactured by Mitsubishi Chemical Corporation, epoxy equivalent weight 210 [g/eq])

EP5: multifunctional epoxy resin (JER-604, manufactured by Mitsubishi Chemical Corporation, epoxy equivalent weight 120 [g/eq])

EP6: flexible epoxy resin (JER-871, manufactured by Mitsubishi Chemical Corporation, epoxy equivalent weight 430 [g/eq])

EP7: room temperature solid bisphenol A type epoxy resin (JER-1001, manufactured by Mitsubishi Chemical Corporation, epoxy equivalent weight 475 [g/eq])

EP8: alicyclic epoxy resin (TH1-DE, manufactured by ENEOS, epoxy equivalent weight 80 [g/eq])

EP9: room temperature solid bisphenol A type epoxy resin (JER-1004, manufactured by Mitsubishi Chemical Corporation, epoxy equivalent weight 925 [g/eq])

EP10: room temperature solid bisphenol F type epoxy resin (JER-4005P, manufactured by Mitsubishi Chemical Corporation, epoxy equivalent weight 1075 [g/eq])

CAT1: aliphatic polyisocyanate (CAT-RT1 manufactured by Toyo-Morton Ltd., non-volatile content concentration 70%)

CAT2: aromatic polyisocyanate (CAT-10L manufactured by Toyo-Morton Ltd., non-volatile content concentration 52.5%)

SC-1: 3-glycidoxypropyltrimethoxysilane (KBM-403 manufactured by Shin-Etsu Chemical Co., Ltd.)

According to the results in Tables 3 and 4, the adhesive for an electrical storage device of the disclosure exhibited excellent 120° C. hot strength in adhesion between the film and the metal foil because the stress parameter satisfied the predetermined range.

In addition, the adhesive for an electrical storage device of the disclosure showed good moldability and heat seal resistance of molded products, and the combinations of the polyester polyol and the room temperature solid bisphenol A type epoxy resin (Examples 1 to 6) tended to provide molded products with excellent high heat durability. Further, combinations of polyester urethane polyol, room temperature liquid bisphenol A type epoxy resin, bisphenol A novolac type epoxy resin, and cresol novolac type epoxy resin (Examples 7, 14, and 15) tended to be excellent in 120° C. hot strength compared with the combinations of epoxy resins other than the above.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An adhesive for an electrical storage device packaging material containing a polyol compound (A), a polyisocyanate compound (B), and an epoxy resin (C), wherein the polyol compound (A) contains an ester bond-containing polyol, wherein the ester bond-containing polyol has an ester bond concentration of 8.5 to 10.5 [mmol/g], and has a weight average molecular weight of 55,000 to 85,000, and the following formula is satisfied when a stress at the time when a cured film obtained by curing the adhesive for an electrical storage device packaging material under the condition of 80° C. for 2 weeks is stretched in a stretched state to twice its length at a speed of 6 mm/min under an environment of 20° C. and 65% RH is S1 [N/mm²], and a stress at the time when the cured film is held for 100 seconds in the stretched state is S2 [N/mm²]

$$10.0 \leq (S1-S2)/S1 \times 100 \leq 40.0. \qquad \text{Formula:}$$

2. The adhesive for an electrical storage device packaging material according to claim 1, wherein the epoxy resin (C) has an epoxy equivalent weight of 90 to 1,200 [g/eq].

3. The adhesive for an electrical storage device packaging material according to claim 1, wherein the ester bond-containing polyol of the polyol compound (A) is a polyester polyol, and the epoxy resin (C) contains an epoxy resin having an epoxy equivalent weight of 150 to 1,000 [g/eq].

4. The adhesive for an electrical storage device packaging material according to claim 1, wherein the ester bond-containing polyol of the polyol compound (A) is a polyester urethane polyol, and the epoxy resin (C) contains an epoxy resin having an epoxy equivalent weight of 100 to 450 [g/eq].

5. The adhesive for an electrical storage device packaging material according to claim 1, wherein a storage elastic modulus of the cured film at 120° C. is $1.00 \times 10^5$ to $9.99 \times 10^7$ [Pa].

6. The adhesive for an electrical storage device packaging material according to claim 3, wherein a storage elastic modulus of the cured film at 120° C. is $1.00 \times 10^5$ to $9.99 \times 10^7$ [Pa].

7. The adhesive for an electrical storage device packaging material according to claim 4, wherein a storage elastic modulus of the cured film at 120° C. is $1.00 \times 10^5$ to $9.99 \times 10^7$ [Pa].

8. An electrical storage device packaging material having a configuration in which at least an outer layer side resin film layer, an outer layer side adhesive layer, a metal foil layer, an inner layer side adhesive layer, and a heat seal layer are sequentially laminated, wherein the outer layer side adhesive layer is a cured product of the adhesive for an electrical storage device packaging material according to claim 1.

9. An electrical storage device container formed from the electrical storage device packaging material according to claim 8, wherein the outer layer side resin film layer forms a convex surface and the heat seal layer forms a concave surface.

10. An electrical storage device comprising:

the electrical storage device container according to claim 9.

* * * * *